(12) United States Patent
Huang et al.

(10) Patent No.: US 10,816,399 B2
(45) Date of Patent: Oct. 27, 2020

(54) TRANSMISSIVE SAMPLING MODULE AND TRANSMISSIVE SPECTROMETER

(71) Applicant: InnoSpectra Corporation, Hsinchu County (TW)

(72) Inventors: Kuo-Sheng Huang, Hsinchu County (TW); Fei-Peng Chang, Hsinchu County (TW); Hsi-Pin Li, Hsinchu County (TW)

(73) Assignee: InnoSpectra Corporation, Hsin-Chu (TW)

( * ) Notice: Subject to any disclaimer, the term of this patent is extended or adjusted under 35 U.S.C. 154(b) by 0 days.

(21) Appl. No.: 16/362,716

(22) Filed: Mar. 25, 2019

(65) Prior Publication Data

US 2019/0301929 A1 Oct. 3, 2019

(30) Foreign Application Priority Data

Mar. 30, 2018 (CN) .......................... 2018 1 0297629

(51) Int. Cl.
*G01J 3/02* (2006.01)
*G01J 3/42* (2006.01)
(Continued)

(52) U.S. Cl.
CPC .............. *G01J 3/0208* (2013.01); *G01J 3/42* (2013.01); *G01N 21/255* (2013.01); *G02B 3/04* (2013.01)

(58) Field of Classification Search
CPC ...... G01J 3/0208; G01J 3/42; G01N 21/0303; G01N 21/255; G01N 2201/0631; G01N 2201/0638; G02B 3/04
See application file for complete search history.

(56) References Cited

U.S. PATENT DOCUMENTS 5,680,209 A 10/1997 Machler
9,829,378 B1 * 11/2017 Parsons ..................... G01J 3/42
(Continued)

FOREIGN PATENT DOCUMENTS

CN 207832666 9/2018

OTHER PUBLICATIONS

Optecks, LLC, "Transmissive DLP NIRscan Nano EVM & Transmissive Nano Module EVM", accessed Oct. 19, 2017, Available at: https://www.optecks.com/Portal/index.php/products-root/spectrometers/spectrometer-with-trasmissive-module and https://www.optecks.com/Portal/index.php/products-root/spectrometers/transmissive-module-evm.

(Continued)

*Primary Examiner* — Hina F Ayub
(74) *Attorney, Agent, or Firm* — JCIPRNET (57) ABSTRACT

The transmissive sampling module includes a light emitting element, an accommodation tank, and a lens group having a positive refractive power. The light emitting element is configured to emit an illumination beam. The accommodation tank is configured to accommodate an object to be measured. The lens group includes a first lens and a second lens. The first lens and the second lens are respectively located at a first side and a second side of the accommodation tank. The accommodation tank is located between the first lens and the second lens. The illumination beam is transmitted to the object after passing through the first lens. The object converts the illumination beam into a sample beam. The sample beam is transmitted to a main body of the spectrometer after passing through the second lens. A transmissive spectrometer having a transmissive sampling module is also provided.

16 Claims, 7 Drawing Sheets

(51) Int. Cl.
*G01N 21/25* (2006.01)
*G02B 3/04* (2006.01)

(56) References Cited

U.S. PATENT DOCUMENTS

2018/0209848 A1* 7/2018 Shimura ............... G01J 3/0208
2019/0204149 A1   7/2019 Huang et al.

OTHER PUBLICATIONS

Texas Instruments Incorporated, "Transmission Module EVM (DLP System Solutions (Optics and DLP electronics))", accessed Oct. 19, 2017, Available at: http://www.ti.com/devnet/docs/catalog/endequipmentproductfolder.tsp?actionPerformed=productFolder&productId=24480.

Pascal Nelson, "DLP® Technology for Spectroscopy", Texas Instruments Incorporated, Aug. 2016, pp. 1-9.

* cited by examiner

TRANSMISSIVE SAMPLING MODULE AND TRANSMISSIVE SPECTROMETER

CROSS-REFERENCE TO RELATED APPLICATION

This application claims the priority benefit of China application serial no. 201810297629.5, filed on Mar. 30, 2018. The entirety of the above-mentioned patent application is hereby incorporated by reference herein and made a part of this specification.

TECHNICAL FIELD

The disclosure relates to a sampling module and a spectrometer, and more particularly to a transmissive sampling module and a spectrometer which a transmissive sampling module may be assembled to or dissembled from.

DESCRIPTION OF RELATED ART

The main operating principle of a conventional transmissive spectrometer is to emit an illumination beam by using a light emitting element. After the illumination light passes through a lens group and an object to be measured, the object absorbs a part of the illumination beam ranging in a spectral band and correspondingly generates a sample beam. The sample beam then passes through the lens group and forms a light spot toward a slit of the main body of the spectrometer, so that the main body of the spectrometer receives the sample beam and analyzes this sample beam to collect the information associated with the object to the measured.

In the conventional transmissive spectrophotometer, however, with the light pattern of the sample beam being corrected by the lens group, the light spot formed by projecting the sample beam toward the slit is an elongated light spot, which is often difficult to be aligned to the slit (for instance, the light spot is inclined with respect to the slit). Besides, the energy distribution of the elongated light spot is not uniform. Under such conditions, non-uniform energy entering the spectrometer engine may be resulted, and the variability (variation) of the measurement result is high (variability of absorbance exceeds 0.01), such that the measurement result is less accurate. If measurement is to be performed on objects with different refractive indexes, the variability of the measurement result provided by the conventional transmission spectrometer is also high (variability of absorbance also exceeds 0.01).

Besides, in the conventional transmissive spectrometer, before the measurement is performed by using the spectrometer, the user needs to individually connect the light sources and the corresponding sample holders through optical fiber tubes. In the meantime, the user is also required to connect the sample holders to the spectrometer engine through the optical fiber tubes. The light emitted from the light sources passes through the sample in the sample holders and is then transmitted to the spectrometer engine through the optical fibers. Said steps require a number of components, whereby the overall volume of the spectrometer is overly large, the manufacturing costs are high, and the usage is complicated.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides a transmissive sampling module that is capable of providing a light spot pattern with uniform energy and large coverage.

The disclosure provides a spectrometer that is able to provide accurate measurement results.

Other advantages can be further illustrated by the technical features broadly embodied and described as follows.

In order to achieve one or a portion of or all of the objectives or other objectives, an embodiment provided in the disclosure provides a transmissive sampling module that may be detached from a main body of the spectrometer. The transmissive sampling module includes a light emitting element, an accommodation tank, and a lens group. The light emitting element is configured to emit an illumination beam. The accommodation tank is configured to accommodate an object to be measured. The accommodation tank has a first side and a second side opposite to the first side. The light emitting element is disposed at the first side. The lens group has a positive refractive power and an optical axis. Besides, the lens group sequentially includes a first lens and a second lens along the optical axis arranged in a direction from the first side to the second side. The first lens is located at the first side and between the light emitting element and the accommodation tank. The second lens is located at the second side, and the accommodation tank is located between the first lens and the second lens. The illumination beam is transmitted to the object after passing through the first lens. The object converts the illumination beam into a sample beam. The sample beam is transmitted to the main body of the spectrometer after passing through the second lens.

In order to achieve one or a portion of or all of the objectives or other objectives, an embodiment provided in the disclosure provides a spectrometer. The spectrometer includes a transmissive sampling module and a main body. The transmissive sampling module includes a light emitting element, an accommodation tank, and a lens group. The light emitting element is configured to emit an illumination beam. The accommodation tank is configured to accommodate an object to be measured. The accommodation tank has a first side and a second side opposite to the first side. The light emitting element is disposed at the first side. The lens group has a positive refractive power and an optical axis. Besides, the lens group sequentially includes a first lens and a second lens along the optical axis arranged in a direction from the first side to the second side. The first lens is located at the first side and between the light emitting element and the accommodation tank. The second lens is located at the second side, and the accommodation tank is located between the first lens and the second lens. The main body of the spectrometer is located at the second side. The illumination beam is transmitted to the object after passing through the first lens. The object converts the illumination beam into a sample beam. The sample beam is transmitted to the main body of the spectrometer after passing through the second lens.

In view of the above, one or more embodiments provided in the disclosure have at least one of the following advantages or effects. In the transmissive sampling module provided in one or more embodiments provided in the disclosure, the refractive power of the lens group is designed to be positive. Such design and the configuration of each element allow the transmissive sampling module to provide the light spot with high energy uniformity and large coverage to the light incident area of the back-end main body of the spectrometer. Since the spectrometer provided herein includes said transmissive sampling module, the spectrometer is able to provide accurate measurement results.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles provided in the disclosure.

DETAILED DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
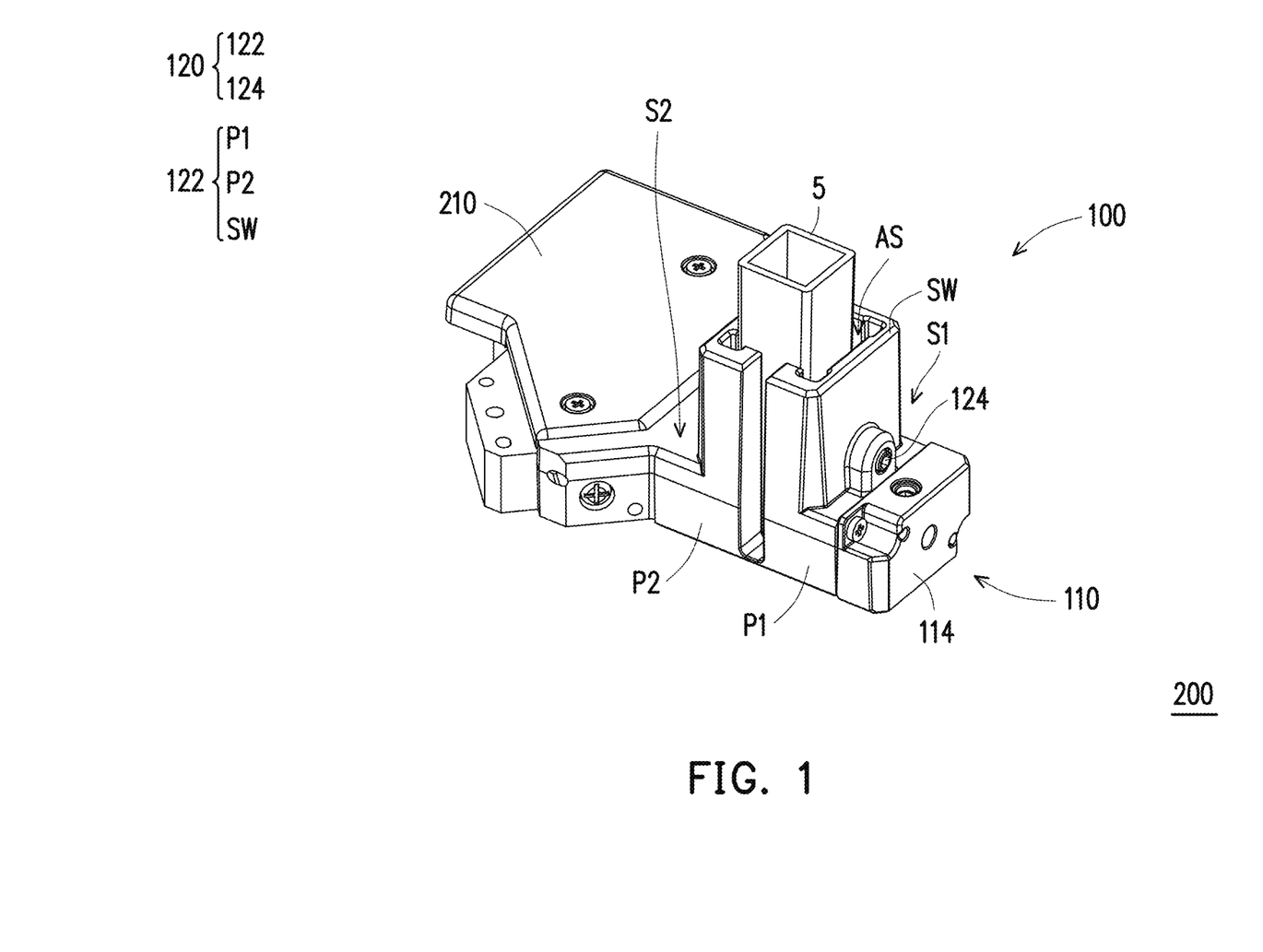
FIG. 1 is a schematic view of an exterior look of a spectrometer according to an embodiment provided in the disclosure.
Figure 2:
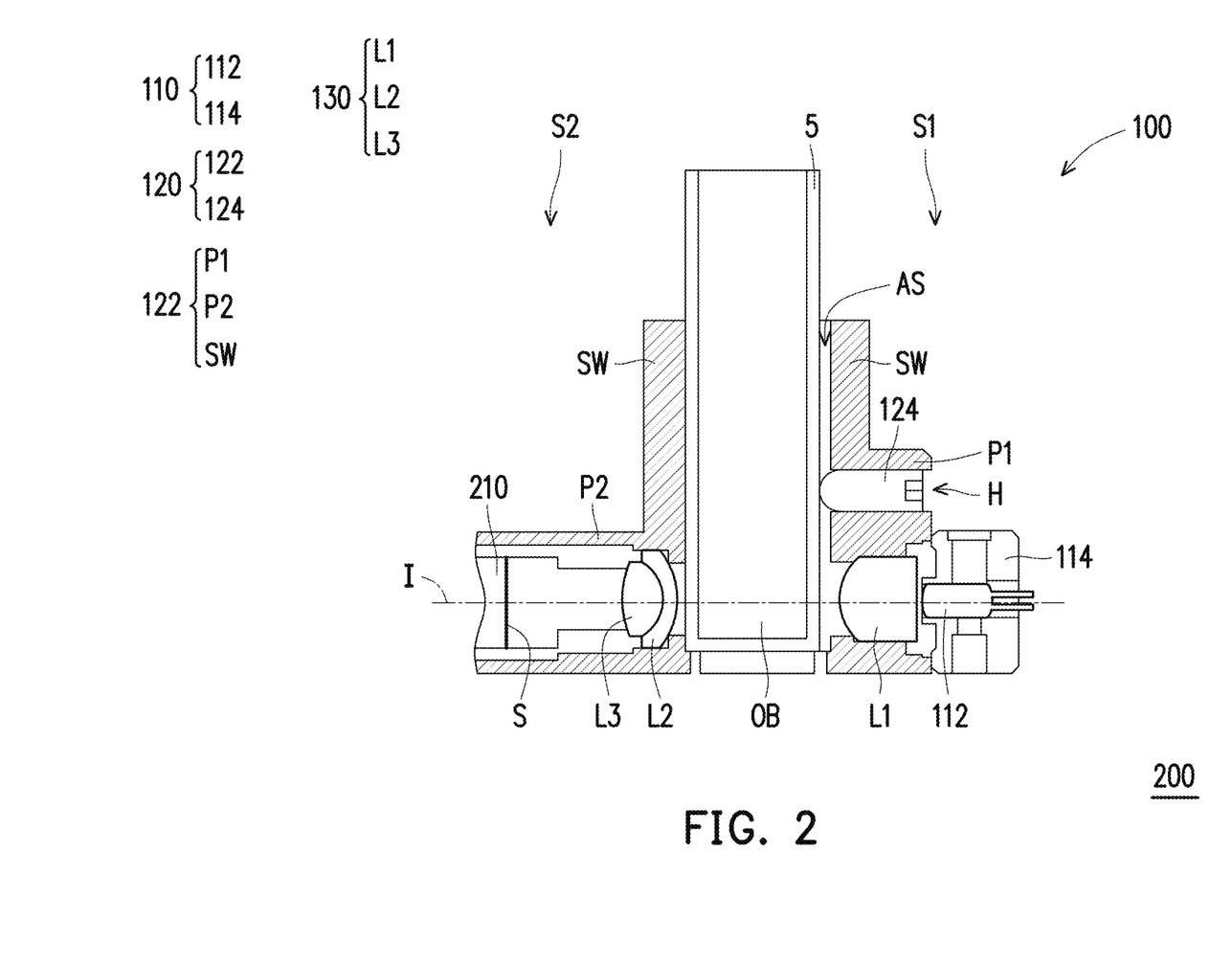
FIG. 2 is a schematic cross-sectional view of the transmissive sampling module depicted in FIG. 1.
Figure 3:
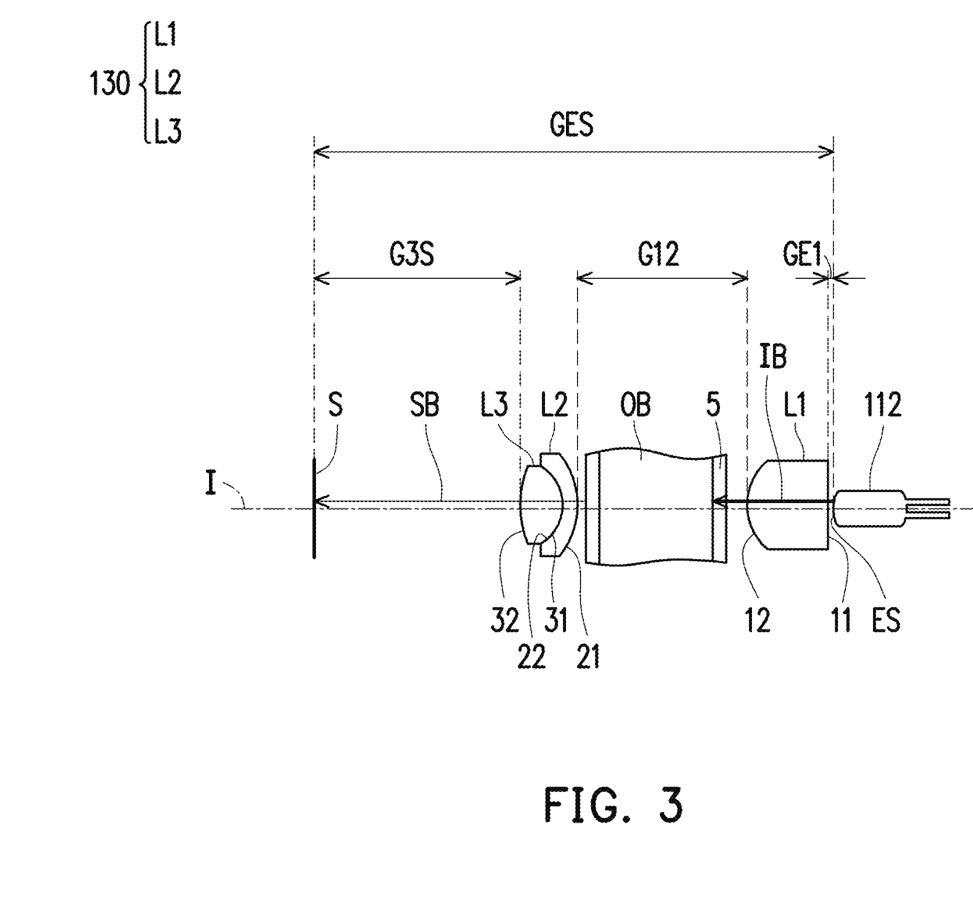
FIG. 3 is a schematic view of a light path of the transmissive sampling module depicted in FIG. 1.
Figure 4:
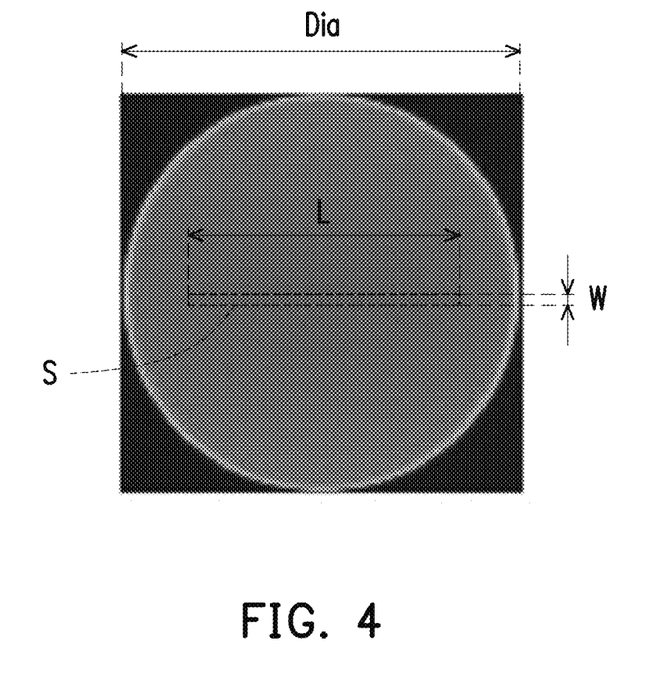
FIG. 4 is a schematic view of an image formed by a sample beam toward a slit of a main body of the spectrometer depicted in FIG. 2.
Figure 5:
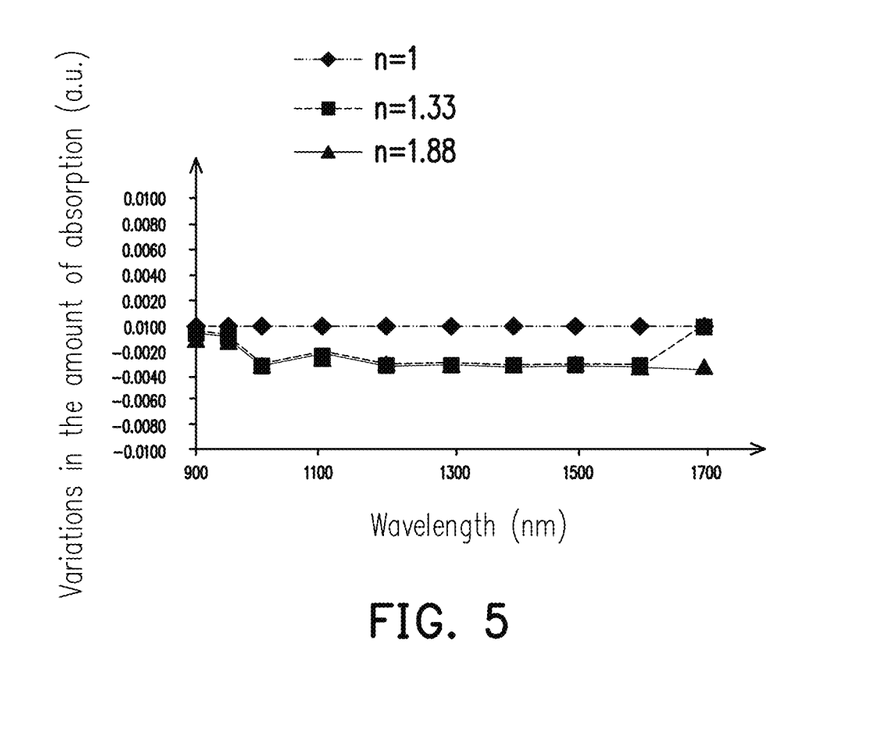
FIG. 5 illustrates variations in intensity of absorption spectra of objects with different refractive indexes according to the measurement by the spectrometer depicted in FIG. 1.

FIG. 1 is a schematic view of an exterior look of a spectrometer according to an embodiment provided in the disclosure. FIG. 2 is a schematic cross-sectional view of the transmissive sampling module depicted in FIG. 1. FIG. 3 is a schematic view of a light path of the transmissive sampling module depicted in FIG. 1. FIG. 4 is a schematic view of an image formed by a sample beam toward a slit of a main body of the spectrometer depicted in FIG. 2. FIG. 5 illustrates variations in intensity of absorption spectra of objects with different refractive indexes according to the measurement of the spectrometer depicted in FIG. 1. For clear illustration, only the light emitting element, the test tube, the object to be measured, the lens group, and the slit of the main body of the spectrometer are depicted, while the other elements are omitted in FIG. 3.

With reference to FIG. 1 to FIG. 3, in the present embodiment, the spectrometer 200 includes a transmissive sampling module 100 and a main body 210. The transmissive sampling module 100 includes a light source assembly 110, a holder 120, and a lens group 130. These elements and the configuration relationships therebetween and functions of the above elements will be described in following paragraphs in detail.

The light source assembly 110 includes a light emitting element 112 and a casing 114. The light emitting element 112 generally refers to an optical element capable of light emitting and is, for instance, a tungsten lamp, a light emitting diode (LED), and so forth, which should however not be construed as a limitation in the disclosure. The light emitting element 112 is disposed in the casing 114 and configured to emit an illumination beam IB. In an embodiment, the wavelength range of the illumination beam IB falls within the range of 400 nanometers to 2400 nanometers, for instance. People skilled in the pertinent art can, according to their measurement requirements, select and use light emitting elements of different numbers, intensities, wavelengths, or types, which should however not be construed as limitations in the disclosure.

The holder 120 includes a tube 122 and an adjustment member 124. Sidewalls SW of the tube 122 extend and form an accommodation tank AS. The accommodation tank AS is configured to accommodate an object OB to be measured. For instance, the object OB may be arranged in the test tube 5. The test tube 5 is further disposed in the accommodation tank AS. Here, the test tube 5 is a light-transmissive element and may be a non-deformable glass tube or may be a flexible light-transmissive tube. In addition, the object to be measured may be but is not limited to liquid, for example. Any object that allows part of the illumination beam IB to pass through may serve as the object to be measured. The test tube 5 may be placed at the sidewalls SW. The adjustment member 124 is, for instance, a screw, which should however not be construed as a limitation in the disclosure. The sidewalls SW of the tube 122 include a screw hole H. The adjustment member 124 is screwed into the screw hole H and may be rotated with respect to the tube 122 and moved forward or backward through the screw hole H, and the adjustment member 124 may stably lean against and fixed onto the test tube 5 in the accommodation tank AS. This arrangement improves stability of the test tube 5 and increases accuracy of measurement. In the present embodiment, the number of the sidewalls SW is four, for instance, so that the accommodation tank AS is a rectangular tank. However, the disclosure is not limited herein. The accommodation tank AS has a first side S1 and a second side S2 opposite to the first side S2, and the tube 122 has a first portion P1 protruding from the first side S1 and a second portion P2 protruding from the second side S2. The first portion P1 of the tube 122 serves to be assembled to the light source assembly 110, so that the light emitting element 112 of the light source assembly 110 is disposed at the first side S1, and that the screw hole H is also disposed at the first portion P1 of the tube 122. The second portion P2 of the tube 122 serves to be assembled to and combined with the main body 210 of the spectrometer 200, so that the main body 210 is disposed at the second side S2 of the accommodation tank AS. The method of assembling the second portion P2 to the main body 210 is performed on said elements through the casing 114 of the light source assembly 110, the first and second portions P1 and P2 of the tube 122, the main body 210 of the spectrometer 200, and a locking member, for instance, which should however not be construed as a limitation in the disclosure.

In the present embodiment, the lens group 130 has a positive refractive power. The lens group 130 sequentially includes a first lens L1, a second lens L2, and a third lens L3 along the optical axis I of the lens group 130 arranged in a direction from the first side S1 to the second side S2, and each of the first, second, and third lenses L1, L2, and L3 has a positive refractive power, respectively. The first lens L1 is disposed in the first portion P1 of the tube 122, so that the first lens L1 is located at the first side S1 of the accommodation tank AS and between the light emitting element 112 and the accommodation tank AS. The second lens L2 and the third lens L3 are disposed in the second portion P2 of the tube 122, so that the second lens L2 and the third lens L3 are located at the second side S2 of the accommodation tank AS. The second lens L2 is located between the third lens L3 and the accommodation tank AS. The accommodation tank AS is located between the first lens L1 and the second lens L2.

To be more specific, in the present embodiment, the lens group 130 is a spherical lens group, for instance. That is, the first lens L1, the second lens L2, and the third lens L3 may be spherical lenses. The aforesaid lenses respectively have a light incident surface 11, a light incident surface 21, and a light incident surface 31 facing toward the first side S1 and a light exiting surface 12, a light exiting surface 22, and a light exiting surface 32 facing toward the second side S2, and the illumination beam IB exits from the light exiting surfaces 12, 22, and 32. The light incident surfaces are the surfaces of the lenses facing toward the light emitting element 112, and the light exiting surfaces are the surfaces of the lenses facing toward the main body 210 of the spectrometer 200. In other words, the first side S1 may be considered as the light incident side, and the second side S2 may be considered as the light exiting side. In the present embodiment, the light incident surface 11 of the first lens L1 is a concave surface, and the light exiting surface 12 of the first lens L2 is a convex surface. The light incident surface 21 of the second lens L2 is a convex surface, and the light exiting surface 22 of the second lens L2 is a concave surface. The light incident surface 31 of the third lens L3 is a convex surface, and the light exiting surface 32 of the third lens L3 is a convex surface. In addition, in the present embodiment, the second lens L2 and the third lens L3 are combined together to form a cemented lens, wherein the relative locations of the cemented lenses on the light path appear to be attached to each other, so that the two lenses are cemented to facilitate assembly into the transmissive sampling module. In other words, only one set of the cemented lens is required, it is not necessary to assemble two lenses, and the tolerance caused by the assembly of the two lenses may be reduced. Note that the lenses are made of glass. This is because the lenses made of plastic may absorb the spectrum of most of the illumination beam, which may interfere with spectrometer's analysis on the spectrum of the object to be measured.

An embodiment of the lens group 130 will be provided below. It should be mentioned that the data listed in Table 1 below are not intended to be construed as limitations in the disclosure. People having ordinary skill in the art may apply the principles provided in the disclosure to properly modify relevant parameters or settings after reading the disclosure, and the proper modifications should still fall within the scope of protection described in the disclosure.

TABLE 1

| Element | Materials | Refractive Index | Abbe number (Vd) |
| --- | --- | --- | --- |
| First lens | Glass | 1.80518 | 25.43 |
| Second lens | Glass | 1.80518 | 25.43 |
| Third lens | Glass | 1.5168 | 64.17 |

The main body 210 of the spectrometer 200 is located at the second side S2 and has a slit S. The slit S is configured to receive a light beam from the lens group 130. An optical element (not shown) and a sensor (not shown) are arranged in the main body 210 of the spectrometer 200. The optical element serves to split the incident light beam coming from the slit S and guide the light beam to the sensor, so that the sensor may sense the distribution of spectrum of the light beam. Note that the main body of the spectrometer provided in the present embodiment is equipped with the slit S, which should however not be construed as a limitation in the disclosure. In another embodiment, the main body of the spectrometer may have an aperture, and the difference therebetween lies in that the requirement for spectrum resolution is not very high if the main body of the spectrometer is equipped with the aperture. In light of the foregoing, the light incident area provided herein represents the slit, the aperture, and so on, and the sample beam is allowed to pass through the light incident area.

According to the present embodiment, the first lens L1, the second lens L2, and the third lens L3 may all be designed as a module. Herein, the first lens L1 is separated from the second lens L2 and the third lens L3, and the second lens L2 and the third lens L3 are disposed together. In another embodiment, the first lens L1 and the light emitting element 112 may be designed as a module. The third lens L3 and the slit S may be designed as a module, i.e., may be located together, which should not be construed as a limitation in the disclosure.

In another aspect, the definition of important parameters and the range of the parameters of the spectrometer 200 as provided in the present embodiment are explained below:

GE1 is a distance on the optical axis I from the light emitting surface ES of the light emitting element 112 to the light incident surface 11 of the first lens L1, wherein GE1 preferably falls within a range of 0 millimeter (mm) to 2 mm, for instance.

G12 is a mirror interval (a distance between the lenses) on the optical axis I from the light exiting surface 12 of the first lens L1 to the light incident surface 21 of the second lens L2, wherein G12 falls within a range of 5 mm to 20 mm, for instance.

G3S is a distance on the optical axis I from the light exiting surface 32 of the third lens L3 to the slit S of the main body 210 of the spectrometer 200, wherein G3S falls within a range of 10.5 mm to 11 mm, for instance.

GES is a distance on the optical axis I from the light emitting surface ES of the light emitting element 112 to the slit S of the main body 210 of the spectrometer 200, wherein GES is equal to or less than 44 mm, for instance.

For clear illustration, GE1, G12, G3S, and GES are illustrated in parallel to and above the optical axis I in FIG. 3.

Besides, other definitions are provided below:

NA is the numerical aperture of the lens group 130, wherein the range of NA is, for example, smaller than 0.25.

D11 is a clear aperture of the light incident surface 11 of the first lens L1, wherein the range of D11 is, for example, between 1 mm and 4 mm.

D12 is a clear aperture of the light exiting surface 12 of the first lens L1, wherein D12 falls within a range of 6 mm to 8 mm, for instance.

D21 is a clear aperture of the light incident surface 21 of the second lens L2, wherein D21 falls within a range of 6 mm to 8 mm, for instance.

D22 is a clear aperture of the light exiting surface 22 of the second lens L2, wherein D22 falls within a range of 6 mm to 8 mm, for instance.

D31 is a clear aperture of the light incident surface 31 of the third lens L3, wherein D31 falls within a range of 6 mm to 8 mm, for instance.

D32 is a clear aperture of the light exiting surface 32 of the third lens L1, wherein D32 falls within a range of 6 mm to 8 mm, for instance.

In view of the above, it can be learned that the clear aperture of the second lens L2 is the same as the clear aperture of the third lens L3.

The light path of the transmissive sampling module 100 provided in the present embodiment will be elaborated in following paragraphs.

With reference to FIG. 3, the illumination beam IB emitted from the light emitting element 112 passes through the first lens L1 along the optical axis I and is then transmitted to the object OB to be measured. The object OB converts the illumination beam IB into a sample beam SB. The sample beam SB is projected toward the slit S of the main body 210 of the spectrometer 200 along the optical axis I after passing through the second lens L2 and the third lens L3, and the sample beam SB enters the main body 210 of the spectrometer 200 through the slit S. The main body 210 of the spectrometer 200 then transmits the sample beam SB to the sensor (not shown) inside the main body 210 through the optical element (not shown) disposed in the main body 210. Based on the sample beam SB, the main body 210 obtains the optical information of the object OB.

For instance, in the present embodiment, the object OB may absorb a portion of spectral band of the illumination beam IB, so as to generate the sample beam SB. According to the sample beam SB, the back-end main body 210 of the spectrometer 200 may determine the absorption spectrum of the object OB through performing the software/hardware function of the main body 210. Namely, in the present embodiment, the optical information is the spectrum of the sample beam SB of the object OB, for instance.

FIG. 4 and FIG. 5 show the observed results by using the transmissive sampling module 100 and the spectrometer 200 described in the present embodiment. With reference to FIG. 4, it can be seen from FIG. 4 that the shape of the image formed on the slit S after the sample beam SB passes through the lens group 130 is a circular-like light spot with a diameter Dia of 1.5 mm to 2.2 mm, and the energy uniformity of the light spot is greater than 99.9%. The light spot of the sample beam SB may completely cover the slit S of the main body 210 of the spectrometer body 200, wherein the slit S has a width W ranging from 10 micrometers (μm) to 200 μm and a length L ranging from 0.5 mm to 1.8 mm, which should however not be construed as limitations in the disclosure.

Thereby, it may be verified that the transmissive sampling module 100 depicted in FIG. 1 provides a light spot pattern (for example, a circular-like light spot) with a large irradiation range and uniform light beam energy at the slit S of the back-end main body 210 of the spectrometer 200. Please refer to FIG. 5, which illustrates variations in intensity of absorption spectra of objects OB with different refractive indexes n (n=1, 1.33, and 1.88) according to the measurements by the spectrometer 200 depicted in FIG. 1 and FIG. 2. The vertical axis in FIG. 5 represents the variations in the amount of absorption. The horizontal axis in FIG. 5 represents the wavelength in unit of nanometer (nm), and the wavelength herein is 900 nm to 1700 nm, for instance. Thereby, it may be verified that if the refractive indexes of the objects OB to be measured are in a range from 1 to 1.88 (i.e., if the measurement is performed on the objects OB with different refractive indexes by the spectrometer 200 depicted in FIG. 1), the variability of absorbance (variations in intensity of absorption spectra) may be less than 0.01.

Based on the above, in the transmissive sampling module 100 provided in the present embodiment, the refractive power of the lens group 130 is designed to be positive. Such design and the configuration of each lens of the lens group 130 relative to the accommodation tank AS and the light emitting element 112 allow the transmissive sampling module 100 to provide the light spot pattern with high energy uniformity and large coverage. Since the spectrometer 200 provided in the present embodiment includes said transmissive sampling module 100, the spectrometer 200 is able to provide accurate measurement results with low variability.

In the transmissive sampling module 100 and the spectrometer 200 provided in the present embodiment, the light emitting element 112 is integrated with the holder 120 through being assembled to the first portion P1 of the tube 122 of the holder 120, for instance. Hence, the conventional steps of connection to the optical fiber tubes and the relevant components are no longer required, the operation becomes more convenient, and the costs may be reduced.

Besides, in the spectrometer 200 of the present embodiment, the first lens L1, the second lens L2, and the third lens L3 in the lens group 130 each have a clear aperture equal to or less than 8 mm. The distance on the optical axis I from the light emitting surface ES of the light emitting element 112 to the slit S of the main body 210 of the spectrometer 200 is less than or equal to 44 mm. The volume of the transmissive sampling module 100 in this embodiment is 50×13×24 mm³. As such, the transmissive sampling module 100 and the spectrometer 200 provided in the present embodiment satisfy the recent requirement for miniaturization.

Note that some descriptions provided in the following embodiments are derived from those provided in the previous embodiments, and the descriptions of the same technical content are omitted. Explanations of the same elements given in the previous embodiment may also apply in the following embodiments and will not be further provided.

Figure 6:
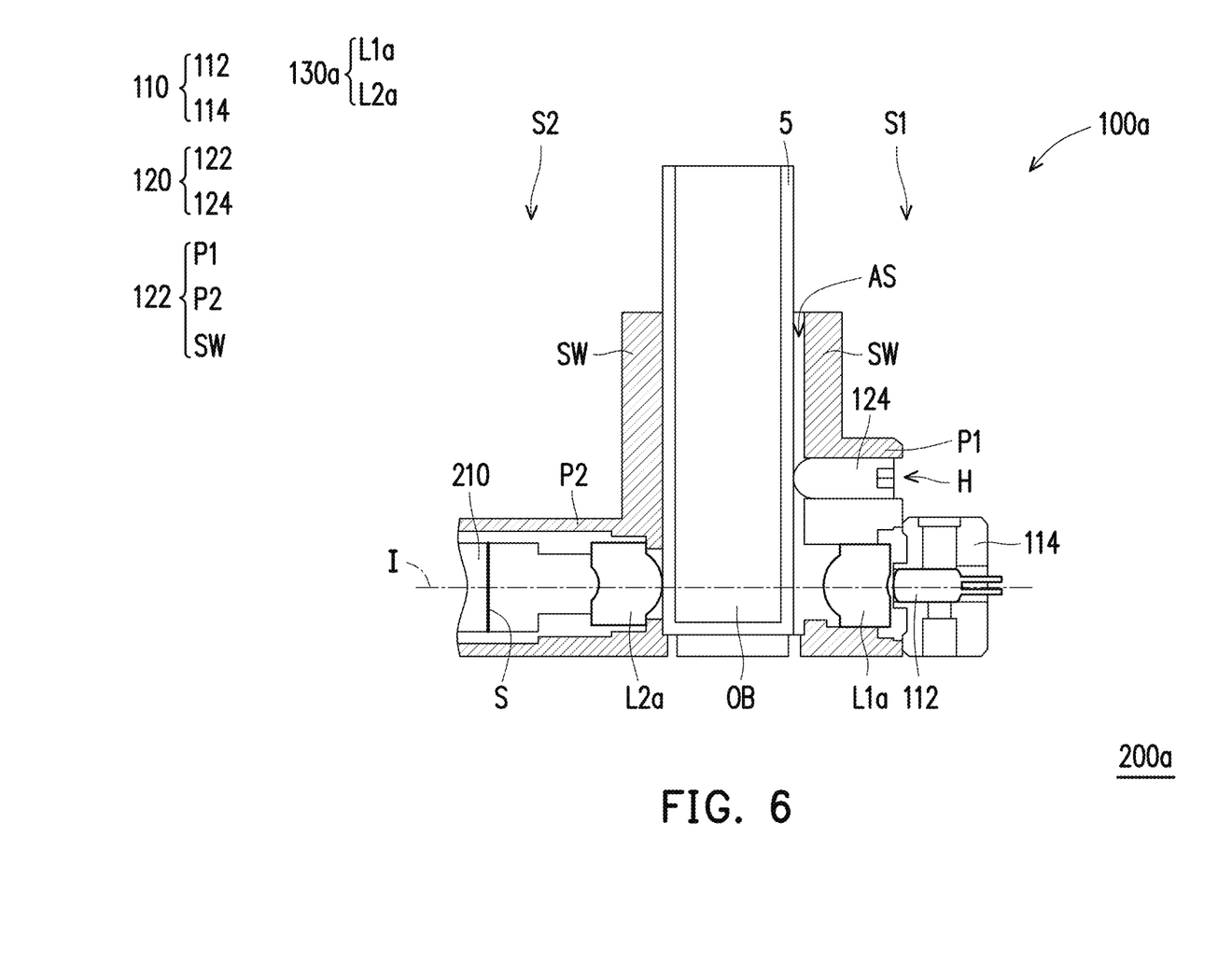
FIG. 6 is a schematic cross-sectional view of a transmissive sampling module according to another embodiment provided in the disclosure.
Figure 7:
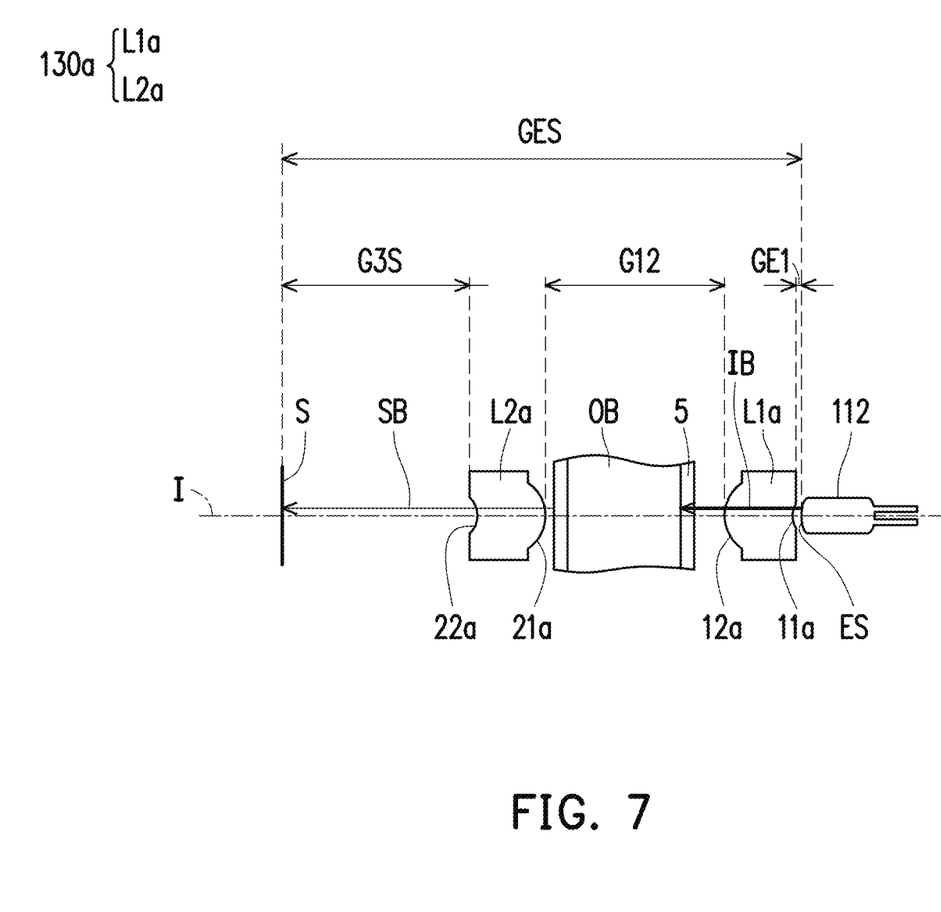
FIG. 7 is a schematic view of a light path of the transmissive sampling module depicted in FIG. 6.
Figure 8:
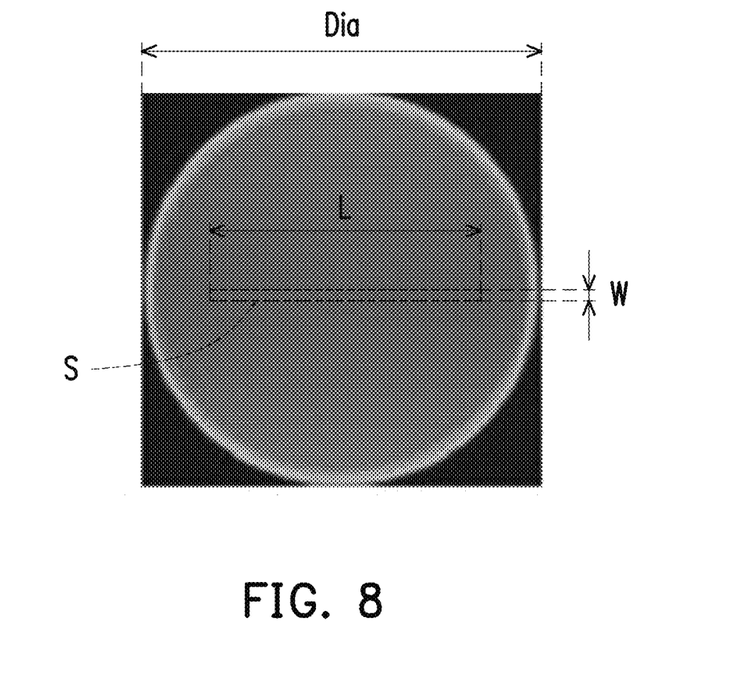
FIG. 8 is a schematic view of an image formed by a sample beam toward a slit of a main body of the spectrometer depicted in FIG. 6.
Figure 9:
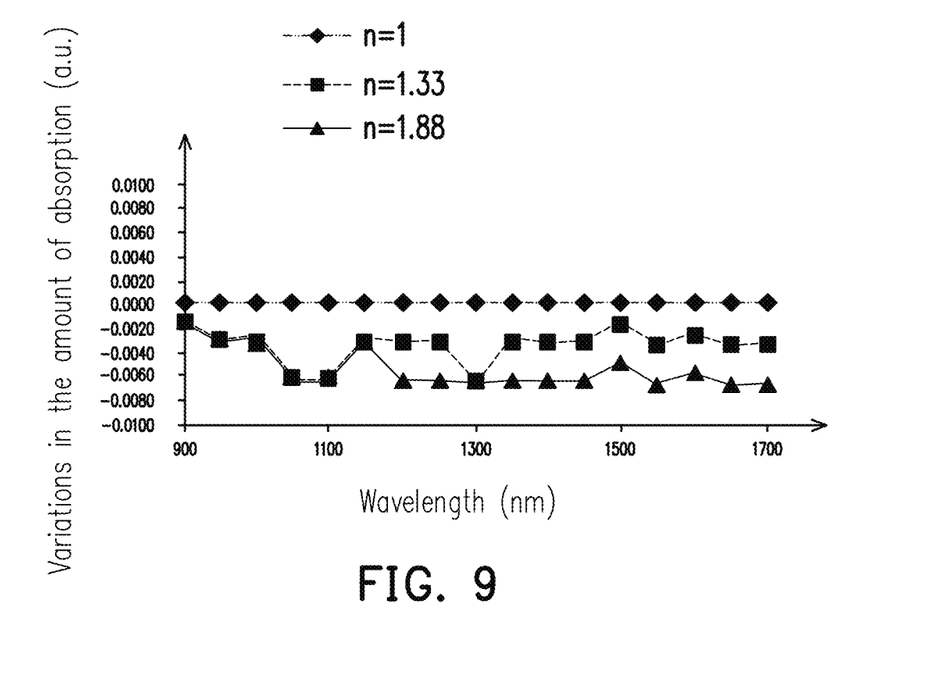
FIG. 9 illustrates variations in intensity of absorption spectra of objects with different refractive indexes according to the measurement by a spectrometer having the transmissive sampling module depicted in FIG. 6.

FIG. 6 is a schematic cross-sectional view of a transmissive sampling module according to another embodiment provided in the disclosure. FIG. 7 is a schematic view of a light path of the transmissive sampling module depicted in FIG. 6. FIG. 8 is a schematic view of an image formed by a sample beam on a slit of a main body of the spectrometer depicted in FIG. 6. FIG. 9 illustrates variations in intensity of absorption spectra of objects with different refractive indexes according to the measurement by a spectrometer having the transmissive sampling module depicted in FIG. 6. For clear illustration, only the light emitting element, the lens group, and the slit of the main body of the spectrometer are depicted, while the other elements are omitted in FIG. 7.

With reference to FIG. 6 and FIG. 7, the transmissive sampling module 100a and the spectrometer 200a provided in the present embodiment are substantially similar to the transmissive sampling module 100 and the spectrometer 200. The main differences lie in that the lens group 130a sequentially includes the first lens L1a and the second lens L2a along the optical axis I of the lens group 130a. The lens group 130a is an aspheric lens group and has a positive refractive power. That is, the first lens L1a and the second lens L2a are both aspheric lenses and respectively have a positive refractive power. The light incident surface 11a of the first lens L1a is a concave surface, and the light exiting surface 12a of the first lens L1a is a convex surface. The light incident surface 21a of the second lens L2a is a convex surface, and the light exiting surface 22a of the second lens L2a is a concave surface.

An embodiment of the lens group 130a will be provided below. It should be mentioned that the data listed in Table 1 below is not intended to limit the invention. People having ordinary skill in the art may apply the principles provided in the disclosure to properly modify relevant parameters or settings after reading the disclosure, and the proper modifications should still fall within the scope of protection described in the disclosure.

TABLE 2

| Element | Materials | Refractive Index | Abbe number (Vd) |
| --- | --- | --- | --- |
| First lens | Glass | 2.022 | 29.06 |
| Second lens | Glass | 2.022 | 29.06 |

Both the first lens L1a and the second lens L2a are aspheric lenses. Therefore, the light incident surfaces 11a and 21a and the light incident surfaces 12a and 22a are aspheric surfaces. Alternatively, one surface of the first lens L1a and one surface of the second lens L2a are aspheric, and the other surface of the first lens L1a and the other surface of the second lens L2a are spherical. A formula (1) of the aspheric lens is provided below:

$$X(s) = \frac{Cs^2}{(1 + \sqrt{1 - (1+k)C^2s^2})} + A_4 s^4 + A_6 s^6 + A_8 s^8 + \ldots \quad (1)$$

In the above formula (1), X is an offset (sag) in the direction of the optical axis I, C is the reciprocal of the curvature radius near the optical axis I, and k is a conic constant, s is the aspheric height, i.e., the distance from any point of the lens to the optical axis I, and coefficients $A_4$, $A_6$, $A_8$ . . . are aspheric coefficients. In the first lens L1a, the value of k of the light incident surface 11a is 0.47, and other coefficients $A_4$, $A_6$, $A_8$ . . . are 0. The value of k of the light exiting surface 12a is −0.35, and other coefficients $A_4$, $A_6$, $A_8$ . . . are 0. In the second lens L2a, the value of k of the light incident surface 21a is 0, and other coefficients $A_4$, $A_6$, $A_8$ . . . are 0. The value of k of the light exiting surface 22a is 0, and other coefficients $A_4$, $A_6$, $A_8$ . . . are 0. However, the disclosure is not limited thereto.

In the present embodiment, the first lens L1a and the second lens L2a may be designed as a module. In another embodiment, the first lens L1 and the light emitting element 112 may be designed as a module. The second lens L2a and the slit S may be designed as a module, which should not be construed as a limitation in the disclosure.

In another aspect, the definition of important parameters and the range of the parameters of the spectrometer 200a as provided in the present embodiment are explained below:

GE1 is a distance on the optical axis I from the light emitting surface ES of the light emitting element 112 to the light incident surface 11 of the first lens L1, wherein GE1 falls within a range of 0 mm to 2 mm, for instance.

G12 is a mirror interval on the optical axis I from the light exiting surface 12a of the first lens L1a to the light incident surface 21a of the second lens L2a, wherein G12 falls within a range of 5 mm to 20 mm, for instance.

G2S is a distance on the optical axis I from the light exiting surface 22a of the second lens L2a to the slit S of the main body 210, wherein G2S falls within a range of 3 mm to 6 mm, for instance.

GES is a distance on the optical axis I from the light emitting surface ES of the light emitting element 112 to the slit S of the main body 210, wherein GES is equal to or less than 39 mm, for instance.

For clear illustration, GE1, G12, and GES are illustrated in parallel to and above the optical axis I in FIG. 7.

Besides, other definitions are provided below:

NAa is the numerical aperture of the lens group 130a, wherein the range of NAa is, for example, smaller than 0.25.

D11a is a clear aperture of the light incident surface 11a of the first lens L1a, wherein D11a falls within a range of 1 mm to 4 mm, for instance.

D12a is a clear aperture of the light exiting surface 12a of the first lens L1a, wherein D12a falls within a range of 7 mm to 9 mm, for instance.

D21a is a clear aperture of the light incident surface 21a of the second lens L2a, wherein D21a falls within a range of 7 mm to 9 mm, for instance.

D22a is a clear aperture of the light exiting surface 22a of the second lens L2a, wherein D22a falls within a range of 1 mm to 4 mm, for instance.

The light path of the transmissive sampling module 100a provided in the present embodiment will be elaborated in following paragraphs.

In view of the above, it can be learned that the clear aperture of the first lens L1a is the same as the clear aperture of the second lens L2a.

With reference to FIG. 7, the light path of the spectrometer 200a is substantially similar to the light path of the spectrometer 200. The main difference is that the sample beam SB passes through the second lens L2a and is then directly projected to the slit S of the main body 210 of the spectrometer 200a. Other explanations are similar to those of the light path of the spectrometer 200 depicted in FIG. 1 and will not be repeated hereinafter.

FIG. 8 and FIG. 9 show the observed results while the transmissive sampling module 100a and the spectrometer 200a described in the present embodiment are provided. With reference to FIG. 8, it can be seen from FIG. 8 that the shape of the image formed toward the slit S by the sample beam SB is a circular-like light spot with a diameter Dia of 1.5 mm to 2.2 mm, and the energy uniformity of the light spot is greater than 99.9%. The light spot of the sample beam SB may completely cover the slit S of the main body 210 of the spectrometer body 200a, wherein the slit S has the width W ranging from 10 μm to 200 μm and the length L ranging from 0.5 mm to 1.8 mm, which should however not be construed as limitations in the disclosure. Thereby, it may be verified that the transmissive sampling module 100a depicted in FIG. 6 provides a light spot pattern (for example, a circular-like light spot) with large coverage and uniform energy. Please refer to FIG. 9, which illustrates variations in intensity of absorption spectra of objects OB with different refractive indexes n (n=1, 1.33, and 1.88) according to the measurement by the spectrometer 200a depicted in FIG. 6. The vertical axis in FIG. 9 represents the variations in the amount of absorption. The horizontal axis in FIG. 9 represents the wavelength in unit of nm, and the wavelength herein is 900 nm to 1700 nm, for instance. Thereby, it may be verified that if the refractive indexes of the objects OB to be measured are in a range from 1 to 1.88 (i.e., if the measurement is performed on the objects OB with different refractive indexes by the spectrometer 200a), the variability of absorbance (variations in intensity of absorption spectra) may be less than 0.01.

Since the embodiment depicted in FIG. 6 is similar to the embodiment illustrated in FIG. 1, the advantages provided in the embodiment depicted in FIG. 6 are similar to those provided in the embodiment illustrated FIG. 1 and will not be described in detail hereinafter.

Besides, in the spectrometer 200a of the present embodiment, the first lens L1a and the second lens L2a in the lens group 130a each have the clear aperture equal to or less than 9 mm; the distance on the optical axis I from the light emitting surface ES of the light emitting element 112 to the slit S of the main body 210 is less than or equal to 39 mm; the volume of the transmissive sampling module 100a in this embodiment is 43×13×24 mm3. As such, the transmissive sampling module 100a and the spectrometer 200a provided in the present embodiment satisfy the recent requirement for miniaturization.

To sum up, one or more embodiments provided herein have at least one of the following advantages or achieve at least one of the following effects. In the transmissive sampling module provided in one or more embodiments provided in the disclosure, the refractive power of the lens group is designed to be positive; said design and the configuration of each lens of the lens group relative to the accommodation tank and the light emitting element allow the transmissive sampling module to provide the light spots with high energy uniformity and large coverage. Since the spectrometer provided herein includes said transmissive sampling module, the spectrometer is able to provide accurate measurement results with low variability.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A transmissive sampling module detachable from a main body of a spectrometer, the transmissive sample module comprising:
    a light emitting element configured to emit an illumination beam;
    an accommodation tank configured to accommodate an object to be measured and having a first side and a second side opposite to the first side, wherein the light emitting element is located at the first side; and
    a lens group having a positive refractive power and an optical axis, the lens group comprising a first lens and a second lens sequentially arranged in a direction from the first side to the second side along the optical axis, the first lens being located at the first side and between the light emitting element and the accommodation tank, the second lens being located at the second side, the accommodation tank being located between the first lens and the second lens,
    wherein the illumination beam passes through the first lens along the optical axis and is transmitted to the object, the object converts the illumination beam into a sample beam, and the sample beam passes through the second lens along the optical axis and is transmitted to the main body of the spectrometer, wherein each of the first lens and the second lens has a light incident surface facing toward the first side and a light exiting surface facing toward the second side, wherein the light incident surface of the first lens is a concave surface, the light exiting surface of the first lens is a convex surface, and the light incident surface of the second lens is a convex surface, and the light exiting surface of the second lens is a concave surface.

2. The transmissive sampling module according to claim 1, wherein the lens group further comprises a third lens located at the second side, the second lens being located between the third lens and the accommodation tank, wherein the sample beam sequentially passes through the second lens and the third lens along the optical axis and is transmitted to the main body of the spectrometer, and wherein the first lens, the second lens, and the third lens are spherical lenses.

3. The transmissive sampling module according to claim 2, wherein each of the first lens, the second lens, and the third lens has a light incident surface facing toward the first side and a light exiting surface facing toward the second side, wherein the light incident surface of the first lens is a concave surface, the light exiting surface of the first lens is a convex surface, the light incident surface of the second lens is a convex surface, the light exiting surface of the second lens is a concave surface, the light incident surface of the third lens is a convex surface, and the light exiting surface of the third lens is a convex surface.

4. The transmissive sampling module according to claim 3, wherein each of the first lens, the second lens, and the third lens has a clear aperture less than or equal to 8 millimeters, and a distance along the optical axis from a light emitting surface of the light emitting element to a light incident area of the main body of the spectrometer body is less than or equal to 44 millimeters.

5. The transmissive sampling module according to claim 2, wherein the second lens and the third lens are combined together to form a cemented lens.

6. The transmissive sampling module according to claim 1, further comprising a holder, the holder comprising a tube configured to form the accommodation tank, the light emitting element being integrated with the holder.

7. A transmissive sampling module detachable from a main body of a spectrometer, the transmissive sample module comprising:

a light emitting element configured to emit an illumination beam;

an accommodation tank configured to accommodate an object to be measured and having a first side and a second side opposite to the first side, wherein the light emitting element is located at the first side; and a lens group having a positive refractive power and an optical axis, the lens group comprising a first lens and a second lens sequentially arranged in a direction from the first side to the second side along the optical axis, the first lens being located at the first side and between the light emitting element and the accommodation tank, the second lens being located at the second side, the accommodation tank being located between the first lens and the second lens, wherein the illumination beam passes through the first lens along the optical axis and is transmitted to the object, the object converts the illumination beam into a sample beam, and the sample beam passes through the second lens along the optical axis and is transmitted to the main body of the spectrometer, wherein the first lens and the second lens are aspheric lenses, wherein each of the first lens and the second lens has a light incident surface facing toward the first side and a light exiting surface facing toward the second side, wherein the light incident surface of the first lens is a concave surface, the light exiting surface of the first lens is a convex surface, the light incident surface of the second lens is a convex surface, and the light exiting surface of the second lens is a concave surface.

8. The transmissive sampling module according to claim 7, wherein each of the first lens and the second lens has a clear aperture less than or equal to 9 millimeters, and a distance along the optical axis from a light emitting surface of the light emitting element to a light incident area of the main body of the spectrometer body is less than or equal to 39 millimeters.

9. A spectrometer comprising a transmissive sampling module and a main body, the transmissive sampling module comprising a light emitting element, an accommodation tank, and a lens group, the light emitting element being configured to emit an illumination beam, the accommodation tank being configured to accommodate an object to be measured and having a first side and a second side opposite to the first side, wherein the light emitting element is located at the first side, the lens group having a positive refractive power and an optical axis, the lens group comprising a first lens and a second lens sequentially arranged in a direction from the first side to the second side along the optical axis, the first lens being located at the first side and between the light emitting element and the accommodation tank, the second lens being located at the second side, the accommodation tank being located between the first lens and the second lens, the main body of the spectrometer being located at the second side, wherein the illumination beam passes through the first lens along the optical axis and is transmitted to the object, the object converts the illumination beam into a sample beam, and the sample beam passes through the second lens along the optical axis and is transmitted to the main body of the spectrometer, wherein each of the first lens and the second lens has a light incident surface facing toward the first side and a light exiting surface facing toward the second side, wherein the light incident surface of the first lens is a concave surface, the light exiting surface of the first lens is a convex surface, the light incident surface of the second lens is a convex surface, and the light exiting surface of the second lens is a concave surface.

10. The spectrometer according to claim 9, wherein the lens group further comprises a third lens located at the second side, the second lens being located between the third lens and the accommodation tank, wherein the sample beam sequentially passes through the second lens and the third lens along the optical axis and is transmitted to the main body of the spectrometer, and wherein the first lens, the second lens, and the third lens are spherical lenses.

11. The spectrometer according to claim 10, wherein each of the first lens, the second lens, and the third lens has a light incident surface facing toward the first side and a light exiting surface facing toward the second side, wherein the light incident surface of the first lens is a concave surface, the light exiting surface of the first lens is a convex surface, the light incident surface of the second lens is a convex surface, the light exiting surface of the second lens is a concave surface, the light incident surface of the third lens is a convex surface, and the light exiting surface of the third lens is a convex surface.

12. The spectrometer according to claim 11, wherein each of the first lens, the second lens, and the third lens has a clear aperture less than or equal to 8 millimeters, and a distance along the optical axis from a light emitting surface of the light emitting element to a light incident area of the main body of the spectrometer body is less than or equal to 44 millimeters.

13. The spectrometer according to claim 10, wherein the second lens and the third lens are combined together to form a cemented lens.

14. The spectrometer according to claim 9, further comprising a holder, the holder comprising a tube configured to form the accommodation tank, the light emitting element being integrated with the holder.

15. A spectrometer comprising a transmissive sampling module and a main body, the transmissive sampling module comprising a light emitting element, an accommodation tank, and a lens group, the light emitting element being configured to emit an illumination beam, the accommodation tank being configured to accommodate an object to be measured and having a first side and a second side opposite to the first side, wherein the light emitting element is located at the first side, the lens group having a positive refractive power and an optical axis, the lens group comprising a first lens and a second lens sequentially arranged in a direction from the first side to the second side along the optical axis, the first lens being located at the first side and between the light emitting element and the accommodation tank, the second lens being located at the second side, the accommodation tank being located between the first lens and the second lens, the main body of the spectrometer being located at the second side, wherein the illumination beam passes through the first lens along the optical axis and is transmitted to the object, the object converts the illumination beam into a sample beam, and the sample beam passes through the second lens along the optical axis and is transmitted to the main body of the spectrometer, wherein the first lens and the second lens are aspheric lenses, wherein each of the first lens and the second lens has a light incident surface facing toward the first side and a light exiting surface facing toward the second side, wherein the light incident surface of the first lens is a concave surface, the light exiting surface of the first lens is a convex surface, the light incident surface of the second lens is a convex surface, and the light exiting surface of the second lens is a concave surface.

16. The spectrometer according to claim 15, wherein each of the first lens and the second lens has a clear aperture less than or equal to 9 millimeters, and a distance along the optical axis from a light emitting surface of the light emitting element to a light incident area of the main body of the spectrometer body is less than or equal to 39 millimeters.

* * * * *